United States Patent [19]

Halmann

[11] 4,219,392
[45] Aug. 26, 1980

[54] PHOTOSYNTHETIC PROCESS

[75] Inventor: Martin M. Halmann, Rehovot, Israel

[73] Assignee: Yeda Research & Development Co. Ltd., Rehovot, Israel

[21] Appl. No.: 22,511

[22] Filed: Mar. 21, 1979

[30] Foreign Application Priority Data

Mar. 31, 1978 [IL] Israel ........................................ 54408

[51] Int. Cl.$^2$ ................................................ C25B 3/04
[52] U.S. Cl. ........................................ 204/72; 204/75; 204/158 R; 204/273; 204/274; 204/275; 204/277; 204/DIG. 3; 429/111
[58] Field of Search ................... 204/72, 73 R, 75–77, 204/129, 273–275, 277, DIG. 3, 158 R; 429/111

[56] References Cited

U.S. PATENT DOCUMENTS

| 3,959,094 | 5/1976 | Steinberg | 204/77 |
| 4,011,149 | 3/1977 | Nozik | 204/129 |
| 4,090,933 | 5/1978 | Nozik | 204/129 |
| 4,094,751 | 6/1978 | Nozik | 204/80 |

Primary Examiner—Aaron Weisstuch
Attorney, Agent, or Firm—Browdy and Neimark

[57] ABSTRACT

A process for the conversion of carbon dioxide or the bicarbonate ion into useful organic compounds, such as formic acid, formaldehyde and methanol, which comprises carrying out the reduction in a photoelectrochemical cell, wherein the cathode is a p-type semiconductor, and at least part of the energy of reduction is supplied by light, including sunlight.

21 Claims, No Drawings

PHOTOSYNTHETIC PROCESS

FIELD OF THE INVENTION

The present invention relates to a novel process for the conversion of carbon dioxide or the bicarbonate ion in solution into organic compounds under the influence of irradiation, such as sunlight. More particularly, the invention relates to such a process wherein carbon dioxide or the bicarbonate ion are reduced to formic acid, formaldehyde and methanol in a photoelectrochemical cell, wherein at least part of the required energy is supplied by light energy, and particularly by solar radiation. The invention further relates to a device for effecting the above defined process. Other and further aspects of the invention will become apparent hereinafter.

STATE OF THE PRIOR ART

Fossil fuels, mainly coal, gas and petroleum, are the remnants of photosynthesis in geological periods. Photosynthesis in algae and higher plants involves the reduction of carbon dioxide to organic compounds, in a complex biochemical process, which simultaneously causes oxidation of water to molecular oxygen, and in which the energy is supplied by sunlight.

There have been many attempts, since more than a century ago, to simulate natural photosynthesis, by trying to carry out the reduction of carbon dioxide with water in the absence of living organisms. According to one approach, this reaction was achieved by electrochemical reduction of carbon dioxide (or of the bicarbonate ion), in which all the energy was supplied from an external power source (e.g. a battery). According to another approach, irradiation with ultraviolet light was used to supply the excitation energy required for the reaction.

The reduction of carbon dioxide and formation of formic acid at the negative electrode during the electrolysis of sodium bicarbonate in aqueous solutions was first observed by N. N. Beketov, Zhurn. Russ. Fiz-Khim. Obshchestva, 1, 33 (1869), and again by N. E. Royer, Compt. Rend., 70 731 (1870), using various metal cathodes. This reduction has been repeated in a variety of modifications, e.g. using mercury or mercury-amalgam cathodes, and using organic solvents for the electrolyte. A recent study of the reduction of carbon dioxide to formic acid in aqueous solutions, at a mercury electrode, also reviews the earlier work: P. G. Russel et al, J. Electrochem. Soc., 124, 1329 (1977). Polarographic studies showed that carbon dioxide, rather than the bicarbonate ion, is the electroactive species, and that formic acid is the initial product, T. R. Teeter et al, J. Chem. Phys. 22, 759 (1954). A drawback of these reactions is the high overpotential required.

Irradiation of aqueous solutions of carbon dioxide, in the presence of ferrous salts, with ultraviolet light, resulted in the formation of formic acid and of formaldehyde, N. Getoff, Z. Naturforsch., 17b, 88 (1962). The reducing agent presumably was the ferrous ion, and such a process can not be sustained after consumption of the ferrous salt.

In the above discussed studies metallic cathodes were used. In the last few years, semiconducting solids, either in the form of single crystals or as polycrystalline surfaces, have been intensively studied for their interaction with electrolytic solutions. The theory of interaction of illuminated semiconductors with electrolyte solutions has been described in several reviews, e.g. H. Gerischer, J. Electroanal. Chem., 58, 263 (1975). In photoassisted catalysis on semiconducting solids, the sites of holes and electrons may be on the same particles suspended in the electrolyte, while in the photoelectrochemical cells, the semiconductor electrode immersed in the electrolyte is connected through an external circuit to a counterelectrode. In p-type semiconductors, in the absence of illumination, there are many holes in the valence band, but only a small number of electrons in the conduction band. Illumination by light of sufficient energy increases the number of both of the holes in the valence band and of electrons in the conduction band. Since there were already many holes in the valence band even before illumination, the relative increase in holes is small. The relative increase in the electron density in the conduction band caused by illumination is large, causing a cathodic current. Interaction with a suitable electron acceptor in the solution causes reduction of this acceptor.

The formation of hydrogen on illuminated p-semiconductors was described by several authors, e.g. A. J. Nozik, Appl. Phys. Let., 29, 150 (1976), who carried out the photoelectrolysis of water to hydrogen and oxygen using combinations of n- and p- type semiconductors as anodes and cathodes, respectively, such as n-$TiO_2$ and p-GaP. Similarly, using a p- type Si cathode and a platinum anode in aqueous sodium chloride solutions, and with the help of an external bias voltage, R. M. Candea, M. Kastner, R. Goodman and N. Hickok, J. Appl. Phys., 47, 2724 (1976), achieved the photoassisted electrolysis of water. These results have since been further elaborated by several authors. An example of photoassisted catalysis was reported by G. N. Schrauzer and T. D. Guth, J. Amer. Chem. Soc., 99, 7189 (1977): the photodissociation of water chemisorbed in $TiO_2$ (rutile) powder to hydrogen and oxygen. In the presence of nitrogen, oxygen was still formed, but instead of hydrogen, the product of reduction was ammonia.

SUMMARY OF THE INVENTION

The present invention relates to photoassisted reactions on p-type semiconducting solids resulting in the reduction of carbon dioxide, and in its conversion into organic compounds. In contrast to purely electrochemical reduction reactions, in the photoelectrochemical reactions part or all of the energy is supplied by light, and preferably by sunlight.

The mechanism of the photoassisted reduction of carbon dioxide involves a step-wise electron transfer. The first stable product, resulting from a two-electron transfer, is formic acid. Surprisingly, in contrast to the electrochemical reduction, which stops essentially at this stage because of the high overpotential for formic acid reduction, in the case of the photoelectrochemical reaction on p-type semiconductors, a further reduction of formic acid occurs, resulting in the formation of formaldehyde and methanol.

P-type semiconductors which can be used as photocathodes for the reduction of carbon dioxide include p-GaP, p-GaAs, p-Si, p-CdTe. Also n-type semiconductors promote the reduction reactions, by interaction with electrons from their conduction band. However, this reaction is usually less efficient with n-type semiconductors. The semiconductors may be used either as single crystals, or as polycrystalline solids or films.

Solvents suitable for use in the electrolyte solution include water, and organic solvents such as acetonitrile, dimethylformamide or propylene carbonate. Carbon dioxide is supplied either as a gas, or it may be contained in the electrolyte, in equilibrium with the bicarbonate ion, $HCO_3^{--}$. As electrolyte there can be used any salt soluble in the solvent used. The preferred electrolytes are the alkali metal carbonates or bicarbonates, such as $Li_2CO_3$, $NaHCO_3$, $KHCO_3$, etc. or alkali metal phosphates. The preferred pH of the electrolyte is pH 5–7.

The counterelectrode can be a metal, such as platinum. However, with metal anodes, it is necessary to separate the cathodic and anodic compartments in order to prevent oxidation of the organic products on the anode. The movement of ionic organic products, such as the formate or oxalate ions to the anode can be prevented by inserting a cationexchange membrane between the catholyte and the anolyte solutions. However, such a membrane will not prevent the diffusion of neutral products, such as formaldehyde or methanol to the anode. According to a preferred embodiment a carbon electrode is used. It was reported that organic compounds such as formic acid and other C, H, O compounds are not oxidized on carbon electrodes: C. H. Hamann and P. Schmode, J. Power Sources, 1, 141, (1976/1977).

The reaction according to the present invention may also be carried out in a cell wherein there is used as counterelectrode a n-type semiconductor, such as for example polycrystalline $TiO_2$, or single crystal n-Si. Furthermore, the reaction can be effected in a cell wherein there are used two photoelectrodes, and in this case the application of an electrical bias is not required.

In the preferred process, the photoelectrochemical cell is operated at a temperature of 70°–90° C. Part or all of the heat required for raising the cell to this temperature is obtained from solar-thermal conversion, by applying a black surface to the back-side of the cell (as in a conventional flat-plate solar collector). An auxiliary heater may be used, to maintain the preferred temperature range. At this elevated temperature, there is a marked improvement in stability of the electrode system, relative to operation at ambient temperature. Also in the preferred process, the photoelectrochemical cell is provided at its top with a fractional distillation column, and the methanol produced in the reaction is stripped off and collected as it is formed.

The invention relates both to the novel process, in all its various aspects and modifications, and also to means for effecting such processes, such as cells of the types defined above and of the type illustrated in the following examples.

It is clear that the above general outline is by way of illustration only and that the underlying principles may be applied to various modifications of the process and means for carrying out the process, which are within the ambit and spirit of the invention.

DESCRIPTION OF THE PREFERRED EMBODIMENT

The following examples are illustrative of the process of the present invention, but are not to be construed in a limiting sense.

EXAMPLE 1

The photoelectrochemical reaction system consisted of a closed glass beaker (about 30 ml volume), containing as electrolyte a $KH_2PO_4$—$K_2HPO_4$ aqueous buffer solution (0.05 molar; pH 6.8), into which was dipped a photoelectrode consisting of a single crystal of p-gallium phosphide (zinc doped; resistivity 0.19 ohm-cm; front surface area 0.24 $cm^2$; cleaned by etching for about 1 min. in a solution of conc. nitric acid, conc. hydrofluoric acid and water, 3:1:4 V/V; the ohmic contact to the back surface of the crystal was made by indiumzinc solder. The back surface and the external lead were insulated using an epoxy cement). The counter electrode was a carbon rod (6 mm diameter), while a saturated calomel electrode served as a reference electrode. A light-beam from a high-pressure mercury lamp was focused with the help of a condensing lens onto the gallium phosphide crystal. Oxygen-free carbon dioxide was continuously bubbled through the solution. A side-port fitted with a rubber-septum, syringe and capillary inlet tube served to withdraw samples of the solution during the photoelectrolysis without opening the system.

Both in the dark and under illumination, a measurable current through the external circuit could be obtained only by applying a cathodic bias to the gallium phosphide electrode. However, in the dark, the bias needed to achieve a given current was very much larger than under illumination. At a light intensity of 0.21 watt/$cm^2$, and applying a cathodic bias of $-1.0$ volt (vs. SCE) to the gallium phosphide crystal, the initial photocurrent was 6 mA/$cm^2$, while the dark current (in the absence of illumination) was only 0.1 mA/$cm^2$. The photocurrent decreased gradually, but after 24 hours stabilized itself at 1 mA/$cm^2$. Analysis of the electrolyte solution indicated the presence of formic acid, formaldehyde, and methanol. The efficiency of conversion of radiant energy into the chemical energy of reduction of carbon dioxide to methanol, in a freshly started photoelectrolysis, was found to be maximal at a cathodic bias of 0.6 volt (vs. NHE), reaching an efficiency of 1.6 percent, this being the value obtained after deducting the electric energy applied as bias. After the passage of 24, 36 and 68 coulombs through the solution, the concentrations of formic acid were 12, 32 and 30 mM/liter, the concentrations of formaldehyde were 0.32, 0.25 and 0.23 mM/liter while the concentrations of methanol were 0.70, 0.98 and 0.81 mM/liter, respectively. Thus, in contrast to the reduction of carbon dioxide on metal cathodes, the photoelectrolysis on p-gallium phosphide does not stop with the production of formic acid, but proceeds further, producing formaldehyde and methanol.

EXAMPLE 2

A run was carried out as in Example 1, but using an n-type polycrystalline $TiO_2$ semiconductor instead of carbon as the counterelectrode, and as electrolyte a 0.1 molar solution of lithium carbonate. After 16 hours of illumination of both electrodes, in the presence of carbon dioxide gas, maintaining a constant current of 0.50 mA (current density 2.1 mA/$cm^2$), while letting the negative bias on the p-GaP cathode rise gradually from 0.86 volt to 1.4 V (vs. SCE), the solution reached a concentration of $1.5 \times 10^{-3}$ M formic acid and $1.0 \times 10^{-3}$ M methanol. Considering that two or six electrons are required for the reduction of one molecule of carbon dioxide to formic acid or to methanol, these correspond to current yields of 30 and 60% respectively.

EXAMPLE 3

A run was carried out as in Example 2, but using an n-type silicon crystal instead of titanium dioxide as the counterelectrode. In this case no external electrical bias was required, since the two photoelectrodes produced a sufficient potential to drive the reaction. After 38 hours of irradiation of both electrodes, in the presence of carbon dioxide gas, the initial current of 0.05 mA had gradually decreased to 0.01 mA. During this period, the concentrations of formaldehyde and methanol reached $2 \times 10^{-3}$ and $3 \times 10^{-4}$ molar, respectively.

EXAMPLE 4

A run was carried out as in Example 1, but using instead of the glass breaker a double-walled glass cell, fitted at its upper end with a fractional distillation column. Through the outer compartment, thermostatted water was circulated. The inner compartment was loaded with a potassium phosphate aqueous buffer solution (0.05 M; pH 5.1), and fitted with p-GaP and carbon electrodes. By maintaining a temperature of 87°–90° C. in the cell, while irradiating the p-GaP electrode with a high-pressure Hg-lamp (light intensity 102 mW/cm$^2$), maintaining a constant current of 0.20 mA, at a bias of 1.00 to 1.12 Volt, at a $CO_2$ flow rate of about 200 cc/min, an amount of 0.31 micromoles of methanol was collected in the distillate during 24 min, corresponding to a Faradaic conversion yield of 61%.

In a similar experiment, carried out by irradiation with monochromatic light of 365 nm (light intensity 6.85 mW/cm$^2$), at a cell temperature of 83° C., using a potassium phosphate buffer (0.05 M; pH 6.2), the efficiency of conversion of radiant energy into the chemical energy of reduction of carbon dioxide to methanol was maximal at a bias of 0.5 to 0.6 volt, reaching an efficiency of 5.5%. Considering the fraction of sunlight available for excitation of p-GaP (band-gap 2.2 eV), this corresponds to a solar energy conversion efficiency of 0.95%.

Using p-GaAs instead of p-GaP, and irradiating with monochromatic light of 546 nm, the solar energy conversion efficiency was only 0.07%.

EXAMPLE 5

This example illustrates a photocatalysed reaction on a semiconducting solid. The reaction occurs on particles suspended in an electrolyte solution. Titanium dioxide powder (1 gram, activated by heating for 6 hours at 600° C. in a quartz tube evacuated to $10^{-4}$ torr) was suspended in aqueous lithium carbonate (0.2 M; 200 ml). Oxygen-free carbon dioxide was bubbled through the solution, which was irradiated with a high-pressure mercury lamp. After 42 hours, the concentrations of formaldehyde and of methanol reached 2.3 and 0.16 mM respectively. After 68 hours, methanol reached a concentration of 0.23 mM.

We claim:

1. A process for converting carbon dioxide or bicarbonate ion by reduction to organic compounds selected from alcohols, aldehydes and carboxylic acids of 1 to 2 C atoms, which comprises carrying out the reduction in a photoelectrochemical cell wherein the cathode is a p-type semiconductor, at least part of the energy of reduction being supplied by light.

2. A process according to claim 1, wherein the light is sunlight.

3. A process according to claim 1, wherein the organic compounds produced are methanol, formaldehyde and formic acid.

4. A process according to claim 1, wherein the material of the second electrode is selected from metal and carbon.

5. A process according to claim 1, wherein the second electrode is an n-type semiconductor.

6. A process according to claim 1, wherein the two electrodes are photoelectrodes.

7. A process according to claim 1, wherein a bias is applied to the electrodes.

8. A process for converting carbon dioxide or bicarbonate to organic compounds which comprises effecting a photoassisted reduction on semiconducting solids, activated to carry both p- and n- type catalytic sites on the same species of semiconductor solids, in contact with carbon dioxide and water.

9. A process according to claim 8, wherein the semiconducting solid is titanium dioxide.

10. A process according to claim 9, wherein the organic compounds are methanol, formaldehyde and formic acid.

11. A process according to claim 10, wherein the organic compounds formed are methanol, formic acid and formaldehyde.

12. A process according to claim 9, wherein the reaction takes place on particles of the titanium dioxide in contact with carbon dioxide and water.

13. A cell for the reduction of carbon dioxide or of bicarbonate ions to organic compounds including methanol, comprising a p-type semiconductor as cathode, a metal, carbon or n-type semiconductor anode, means for illuminating the semiconductor electrodes with light in the visible range, and distillation column means for stripping off and collecting the methanol produced when in use.

14. A cell according to claim 13, wherein the anode is a n-type polycrystalline semiconductor.

15. A cell according to claim 14, wherein the reaction is effected on particles of a semiconductor suspended in an electrolyte, wherein means are provided for effecting such suspension during the reaction.

16. A cell according to claim 15 wherein there are provided means for suspending the particles by bubbling through carbon dioxide.

17. A cell according to claim 13, further including means for applying an electrical bias to said electrodes.

18. A cell according to claim 17, wherein the cathode is selected from p-GaP, p-GaAs, p-Si and p-CdTe.

19. A cell according to claim 17, wherein the anode is selected from $TiO_2$ and Si-semiconductors.

20. A cell according to claim 13 or 17, wherein means are provided for maintaining the electrodes and the necessary solutions within the temperature range of 70°–90° C. when in use.

21. A cell according to claim 13, wherein both electrodes are photoelectrodes of the p- and n-types.

* * * * *